D. T. KENNEY.
HEATING SYSTEM.
APPLICATION FILED MAY 7, 1915.
1,352,371.
Patented Sept. 7, 1920.
5 SHEETS—SHEET 2.
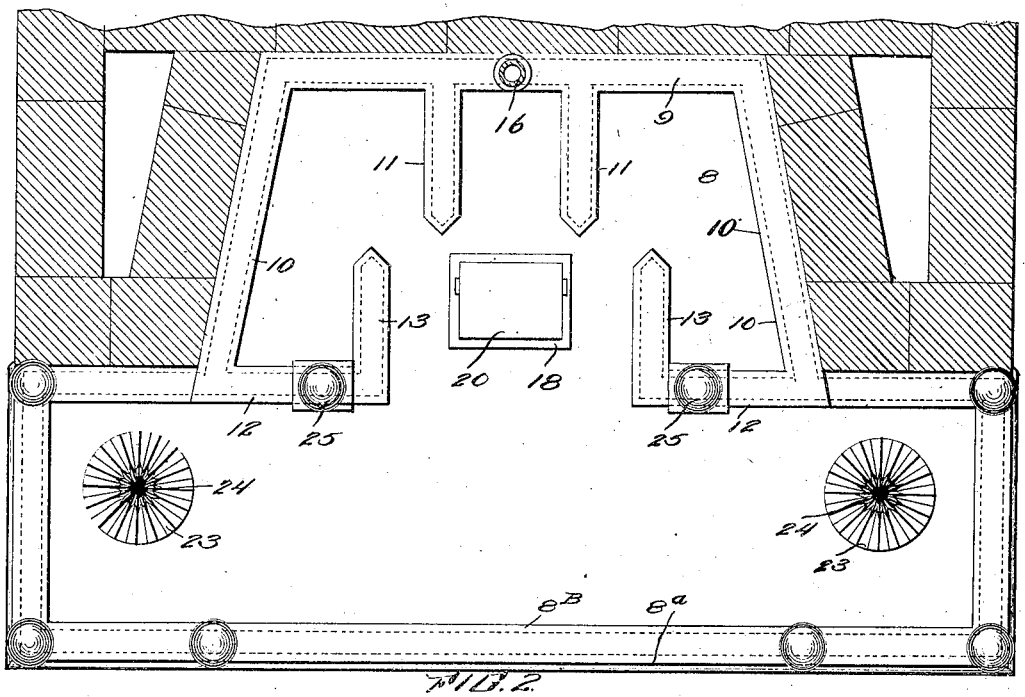
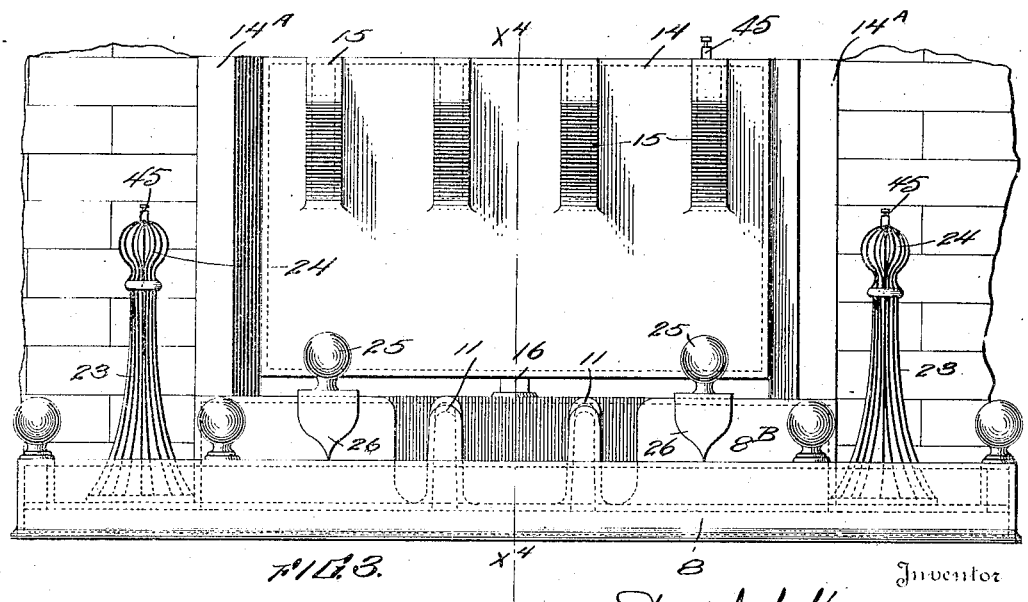

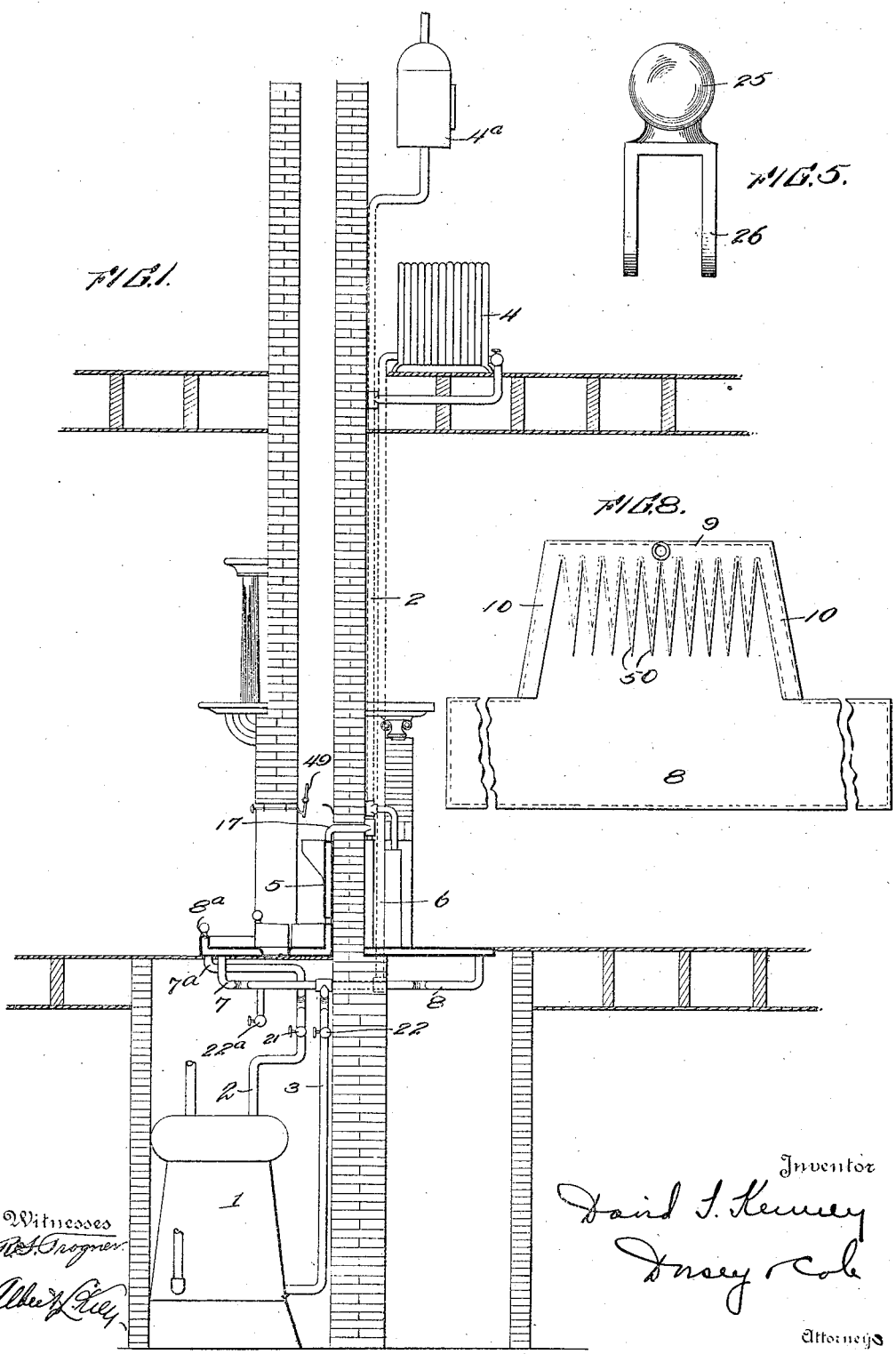

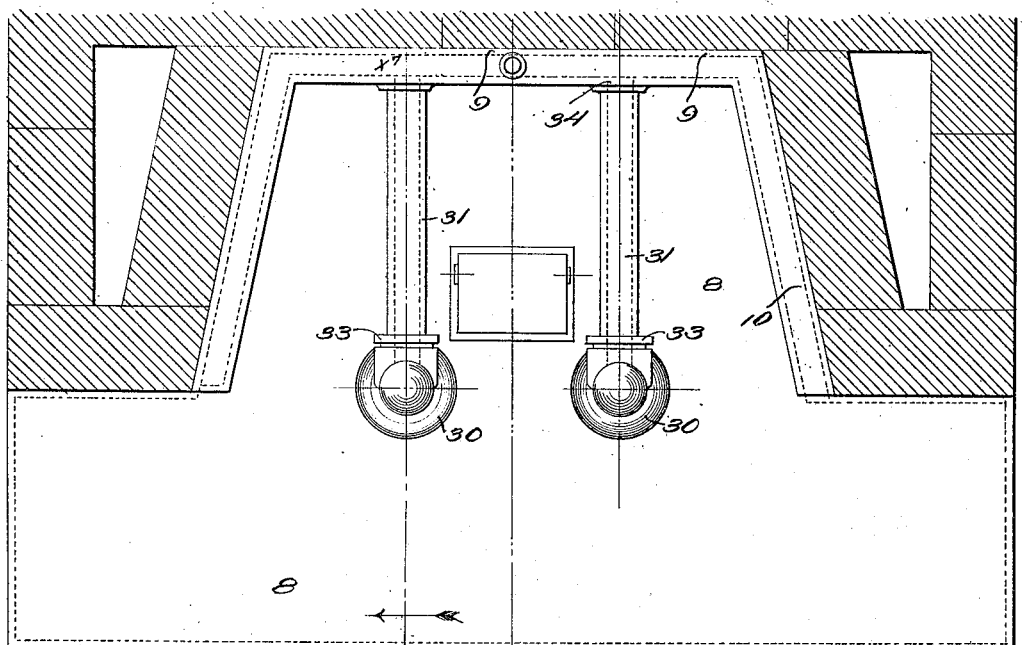
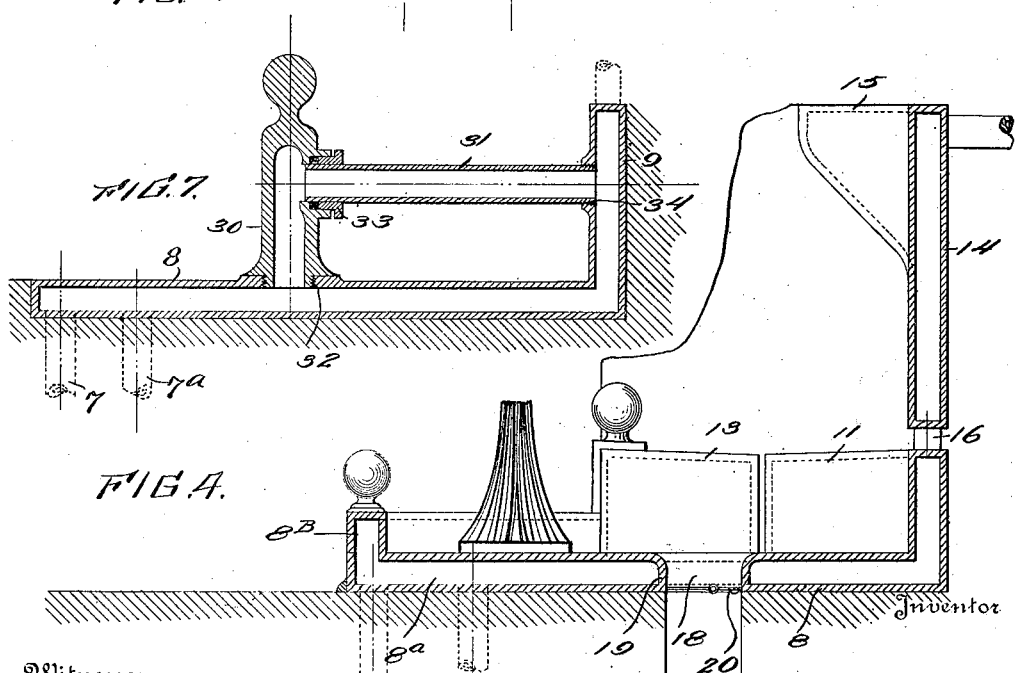

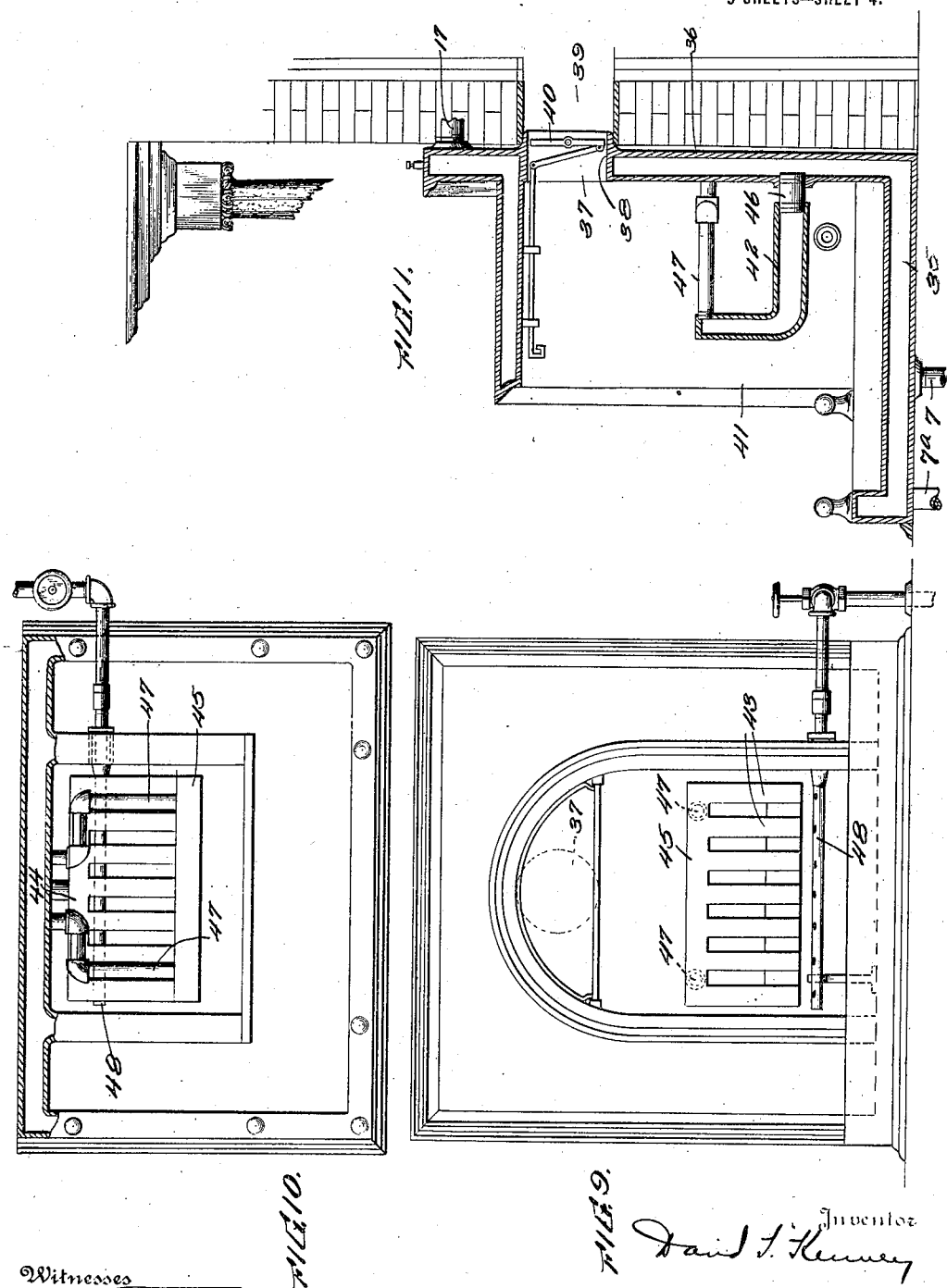

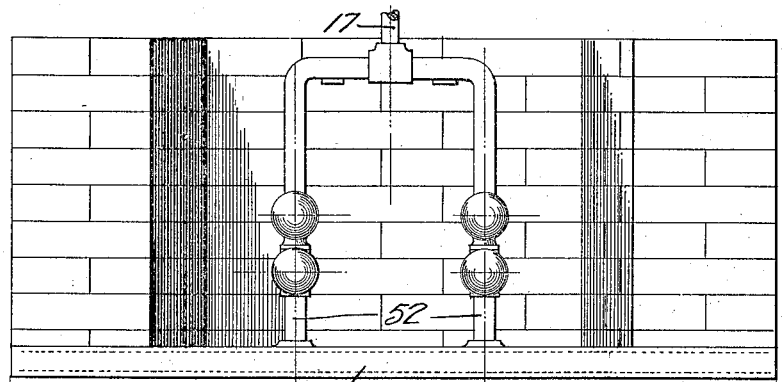
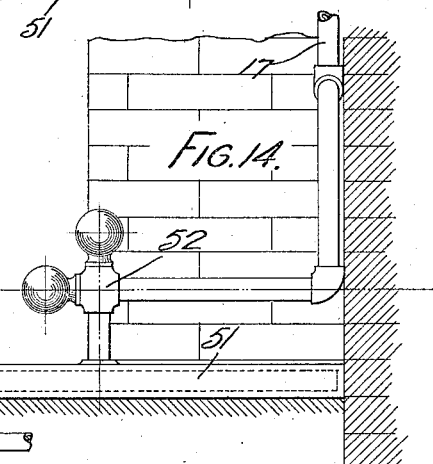
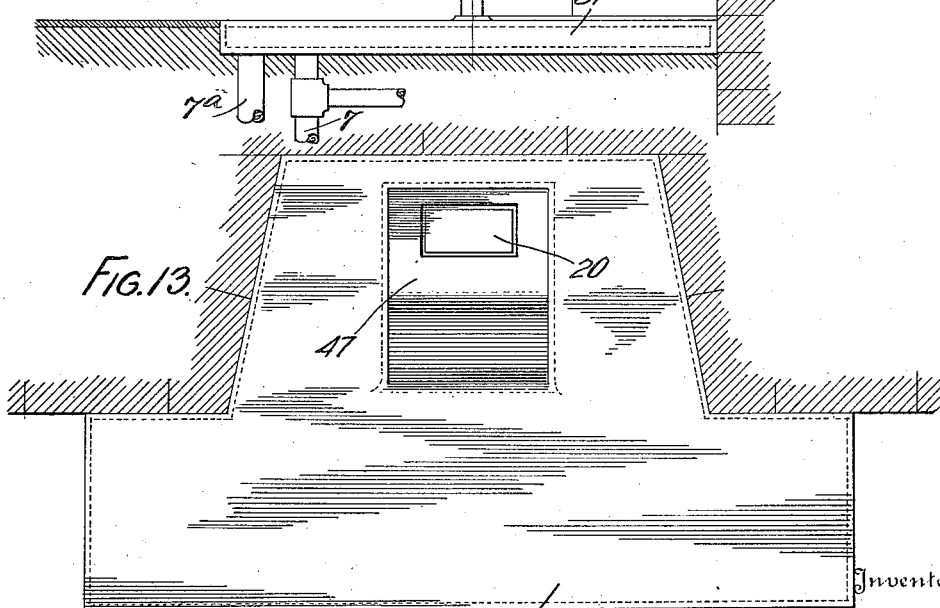
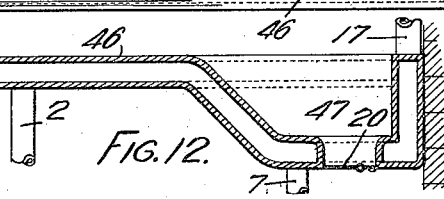

UNITED STATES PATENT OFFICE.

DAVID T. KENNEY, OF NORTH PLAINFIELD, NEW JERSEY.

HEATING SYSTEM.

1,352,371.   Specification of Letters Patent.   Patented Sept. 7, 1920.

Application filed May 7, 1915. Serial No. 26,568.

*To all whom it may concern:*

Be it known that I, DAVID T. KENNEY, a citizen of the United States of America, and a resident of North Plainfield, New Jersey, have invented certain new and useful Improvements in Heating Systems, of which the following is a specification.

My invention has for its object to permit the use of fire-places in a more effective manner than is now commonly the case.

As is well known, the heat generated in a fire-place and utilized in raising the temperature of the room bears only a small proportion to the total heat units generated by the combustion of the fuel. This has led to the abandonment of fire-places to a great extent as heating means, although the places are often installed in new buildings in deference to architectural traditions, and because of the artistic results produced thereby. Frequently, these fire-places are "blind" i. e., do not connect with a chimney flue and serve no strictly utilitarian function.

By the devices described in this application, I am not only enabled to utilize a greater proportion of the heat generated in a fire-place, but am enabled to utilize fire-places in which there is or can be, no fire, as a source of heat, thus enabling me to remove to a greater or less extent the radiating elements now used in connection with steam or hot water heating from places in which they are now put, and to locate radiating elements in fire-places, heretofore useless.

My invention for the purposes indicated contemplates the installation in the fire place of, or the forming of fire-places by elements, either adapted to absorb heat from combustion taking place therein, and by their construction adapted to radiate into the room itself the heat so absorbed in a more perfect manner than the heat would be radiated from the fire-place itself, were my invention not present therein, or else adapted for use as a heat-radiating element. In the latter case, the fire-place element is connected to a proper heat-absorbing element, which may be either a hot water heater or a steam boiler of usual construction and location, or may be of a fire-place element of the construction first indicated. Indeed a heat-absorbing element located in or forming a fire-place as first above indicated, may, when properly connected with and piped to radiating elements of any approved construction located where desired, be used as the means of heating such radiators by a proper circulation of steam or hot water from the former to the latter.

The invention further consists in the construction of the fire-place elements, whereby they are the better adapted for the purposes had in view by their use, viz., the absorption of heat from the fire, the transfer of such heat to the fluid-circulating medium, the proper transfer of the heat of the circulating medium to radiating surfaces forming part of the fire-place element and so arranged as to economically heat the room; and the use of the surfaces of the fire-place elements themselves as effective heat-radiating parts when not used as heat-absorbing parts and when properly connected to a proper heater, and the arrangement and construction of the several parts of the elements, whereby a proper circulation of the steam or water is insured, both for the purpose of the economical utilization of the heat and for the protection of the elements themselves.

Referring to the accompanying drawings in which corresponding parts are designated by corresponding marks of reference,—

Figure 1 is a typical elevation of a building having a system installed therein containing this invention.

Fig. 2 is a plan view of the hearth casting of a fire-place element, constructed in accordance with this invention, and adapted to serve as a heat-radiating and heat-absorbing element.

Fig. 3 is a front elevation thereof with an elevated water-back added thereto.

Fig. 4 is a transverse section on line $X^4$—$X^4$ of Fig. 3.

Fig. 5 is a detail of one of the standard shown in the preceding figures.

Fig. 6 is a plan view of another form of the fire-place element such as shown in Fig. 2.

Fig. 7 is a transverse vertical section thereof on lines $X^7$—$X^7$ of Fig. 6.

Fig. 8 is a plan view of a fire-place element in the form of a radiator.

Fig. 9 is an elevation of an element constructed in accordance with this invention, and forming a fire-place.

Fig. 10 is a horizontal section thereof.

Fig. 11 is a vertical section thereof.

Fig. 12 is a fore and aft section through a fire-place element falling within the broad scope of this invention.

Fig. 13 is a plan view thereof.

Fig. 14 is a fore and aft section of a form of hearth also falling within the broad scope of this invention; and Fig. 15 is a front view thereof, accessory features being shown in dotted lines.

In Fig. 1, which shows a hot water heating system embracing the several features of my present invention, is seen a hot water heater 1, of well known construction located in the basement or cellar and connected by the flow and return pipes 2 and 3, respectively, with a radiator or radiators 4, located at desired points on an upper story or stories, and also connected with an expansion tank 4$^a$. All of the above features are well known and may be of standard structure, and therefore demand no further description.

At 5 and 6 are seen fire-place elements, constructed in accordance with this invention, these being connected to the flow pipe 2, and to the return pipe 3 by the branches 7 and 7$^a$.

Referring to Figs. 2, 3 and 4, I have shown therein a fire-place element, such as is shown at 5 in Fig. 1, and constructed to act both as a heat-absorber and radiator when combustion takes place in it, and in the arrangement shown in Fig. 1, to act as a radiator if no fire is used in it.

The element comprises a base 8, from the rear of which rises a back wall 9, and from the sides of which, toward the rear, rise the side-walls 10, the back and side walls being so shaped as to snugly fit within the selected fire-place, while the base on front, of the side-walls is widened out laterally and continued forwardly to form a hearth 8$^a$ in front of the fire-place. The parts named may be, but are not necessarily integral, each in itself and together, and are all hollow, the interval cavities therein communicating freely with each other wherever the parts in which they are contained abut against and are in contact with each other. The parts described form a combustion chamber inside in the fire-place.

Arising from the back of the base and within the combustion chamber are the back andirons or log supports in the form of hollow ridges 11, the internal cavities of which at their rear ends connect with the cavity in the back wall and at their bottom with the cavity of the hollow base. The ridges are located on each side of the transverse center line of the element.

The side walls, at their forward end, are continued inwardly toward the transverse center-line, forming front walls 12, which at their inner ends are extended rearwardly, parallel with each other, on opposite sides of the transverse center line and on the outside of the ridge-walls 11, thus forming the front andirons 13, the walls 12 and the andirons 13 being hollow, the cavities therein forming continuations of the cavities in the side-walls 10, and being in communication with the cavity in the base.

As an additional heat-absorbing surface, I may, as shown, place within the fire-place and above the parts described above, a back consisting preferably of a hollow flat casting 14 and wing-walls 14$^a$ forming a water back, and having on its forward face at its upper end, hollow ribs 15. Such a water back may be connected to the main element by a short nipple 16 or other suitable coupling, arising from the top of the back wall and entering the bottom of the water-back.

As seen in Fig. 1, a pipe 17 leads from the top of the water back to the flow pipe 2, while the pipe 7 enters the base 8 near the front thereof. It will be noted in the figure referred to that the front part of the base extends out into the room in front of the fire-place, forming the hearth 8$^a$ therefor, and it is into this portion of the base that the pipe 7 leads.

By preference, an opening 18 is formed in the base 8 between the front andirons 13, the opening being surrounded by walls 19 uniting the top and bottom walls of the base. This opening, which may be provided with a door 20, permits the discharge of ashes from the fire-place and the walls 19 around it serve to strengthen the base. It will be noted that the hearth formed by the front part of the bottom of the casting takes the place of the brick or stone hearths now commonly employed in front of fire-places. By preference it is laid in some non-conducting cement (say of asbestos or magnesia). It may either be laid flush with the floor, or slightly raised above it, (see Fig. 4) and in the latter case, may have a fender wall 8$^B$ erected around its edges. This wall may also be hollow, and be in communication with the hollow base to serve as additional radiating surface.

With the construction above described, if a fire is built on the andirons, a certain part of the heat generated thereby is imparted throughout the walls about and in the combustion chamber to the water contained in the interior thereof. This causes the water to circulate through the piping system to cooler portions which are thereby heated, the heat so imparted to the water being in addition to and supplemental of the heat due to the heater 1. Among the parts heated by the water is the hearth 8$^a$ formed by the fore part of the casting which thus forms a heat radiating part of the fire-place element. This hearth due to its location out in the room and at the floor level affords an efficient radiating surface, augmenting the heat due to the radiation from the fire in the fire-place element.

If no heat-absorbing element other than the fire-place element itself be present in the system, as would be the case if the heater 1 be removed or be temporarily cut off by the valves 21 and 22 in the flow and return pipes 2 and 3 near the heater, the water contained in the system will be heated only by combustion of the fuel in the fire-place element, and in its circulation will flow through the hearth, warming it as before. In such a case it is desirable to provide a valve connection 22$^a$ to a suitable water supply to permit the proper amount of water to be maintained in the system and to make good evaporation losses.

The radiating surface formed by the hearth may be augmented by placing thereon on each side of the fire-place radiating elements of any preferred construction. In the drawings I have shown such radiating elements as each formed of a hollow column 23, each preferably having its surface ornamented, roughened or corrugated, as by fins or vanes 24, to increase its radiating surface. The flat top of the hearth permits one or more of these columns to be screwed therein or thereon on each side of the fire-place opening, and from their location and character these may be made not only useful as radiating units but ornamental.

In the construction of the fire-place element shown in Figs. 2, 3 and 4, it will be seen that the andirons to support the fire instead of being continuous from the back to the rear of the fire-place, are discontinuous, and that the back andirons are out of line with the front ones. This, while it provides for a support of the fire from front to back without interruption, also provides that the front supports are farther apart than the rear ones, as is desirable, and gives additional heating surface. Moreover, inasmuch as with the construction shown, the andirons, for convenience in casting, are formed as ridges arising from the base, and not apertured from side to side, by so placing the andirons out of line an opening is formed between them, and in the fire-place, level with the base of the fire-place element, through which opening the ashes may be swept to the ash opening without bringing them out in the room. This discontinuity of the front and rear andirons renders the front walls 12 of great use in connecting the forward ends of the front andirons throughout their height with the side walls, thus providing for the proper circulation of water up from the base and through the irons. The tops of the front and rear irons may moreover, be slightly downwardly inclined toward the rear and front, respectively, as is shown exaggerated in Fig. 4 for the purposes of illustration, to aid this circulation. This will also serve to center the logs and prevent their rolling.

Standards, preferably ornamental and removable, may also be employed to prevent the fire from falling out. In Fig. 5 I have shown in detail such a standard. As there illustrated, it embraces a head 25, and fingers 26, the latter being adapted to straddle the front walls 12 by which the standards will be held in place. Such standards by their contact with the heated walls of the fire-place element are heated by conduction and serve as radiating parts.

In Figs. 6 and 7, I have shown another form of fire-place element, and in this there is a base 8, back wall 9, and side walls 10, as in the form first described. In the construction here referred to the andirons are not integral with the other parts, but are formed by hollow standards 30 located at or near the front of the fire-place, and horizontal tubular horizontal members 31 connecting them with the back wall. The standards may be provided with nipples 32 by which they may be screwed into suitably tapped openings in the top of the base and through which their central cavities communicate with the cavity of the base. On its rear side, and at a suitable height, each standard is provided with a suitable packing box 33, into which the forward end of the corresponding tubular member projects, its rear end being connected with and entering a suitably tapped hole 34 in the rear wall. By this construction provision is made for the expansion and contraction of the horizontal members under the variations of temperature to which they are subjected.

Inasmuch as this embodiment of my invention provides for a passage below the andirons from side to side thereof, and for an andiron continuous from the front to rear of the fire place in it the front walls 12 of the preceding figures are not necessary, as the water circulates up within the standards and thence rearwardly through the tubular horizontal members 31 to the back wall 9.

In Figs. 9, 10, 11, I have shown a form of my invention in which the fire-place is formed, not by the walls of the building, but by a structure adapted to stand in a room, against, or close to a wall and to be connected with a flue opening in such wall. This form permits the use of my invention in buildings not having either real or spurious fire-places built therein. The structure as shown, comprises a base 35, a back 36, through which is formed the flue opening 37 having a surrounding collar 38 adapted to fit within the flue opening 39 in the house wall, the opening 37 being provided with a damper 40. Arising from the base, and projecting forwardly from the back, is a hollow arch 41, forming the sides and top of a combustion chamber, in which is contained a grate 42. The interior cavity of the arch is connected at its lower ends on each side of the combustion chamber with the cavity of the base, and at its rear with the cavity of the hollow back.

The grate consists of bars 43 having their rear ends connected by a rear cross bar 44, and their front ends extended up and connected by a front cross bar 45. All of these parts are hollow, the cavities in each of the several parts communicating with the cavities in the parts connected therewith. The rear cross bar is fastened to the back in any suitable manner, and has its cavity connected with the cavity in the back also in a suitable manner, as by nipples 46, while the cavity of the upper front bar is connected to the cavity in the back by tubular ties 47. A suitable burner 48 for gaseous fuel is shown as projecting within the combustion chamber below the grate, which may be filled with refractory material to be heated to incandescence by the flame from the burner. It is obvious, however, that if desired a fire may be built in the grate.

As shown, a pipe 17 is led from near the top of the back wall to the circulating system, while pipes 2 and 7 enter the bottom. As in the previous construction other means for heating the circulating medium or of radiating the heat therefrom may be connected to the circulating system.

It is obvious that it is immaterial, in so far as affects certain features of the invention herein described, what may be the fuel burnt within the fire-place element, it being understood that the structure of parts within the combustion chamber be properly adapted to receive the fuel used.

In case there be no fire in a fire-place element constructed in accordance with this invention, and connected with a heat-absorbing element, such as the boiler of the furnace 1 (see Fig. 1) all the exposed surfaces of the fire-place element become radiating surfaces, certain of them changing their character from heat-absorbing to heat-radiating ones. As this change is one liable to frequently occur, I prefer to place in the flue from the combustion chamber an adjustable damper 49 (Fig. 1) or 40 (Fig. 11) which may be closed when the element is used merely as a radiating one, to prevent loss of heated air up the chimney.

If desired, however, a fire-place element within the scope of certain features of this invention may be constructed with a view of using it only as a radiating element. Such an element is shown at 6 in Fig. 1, and also in Fig. 8. Such a radiating fire-place element consists of the base 8, back wall 9 and side walls 10, adapted to fit within a fireplace, the base projecting forwardly from the fire-place to form a hearth as before described. By preference, the front of the back is vertically corrugated as at 50, such corrugations extending out in the space which would be needed for a combustion chamber if a fire was present in the element.

It is obvious that any desired configuration either from the esthetic or utilitarian point of view may be given to the part inside the fire-place. Thus a radiating element in the shape of a log of wood may be placed between the side walls and suitably connected with the circulating system. Inasmuch as such an element does not contemplate the presence of a fire, the fire-place in which it is located may be spurious and have no flue connection, this being shown at 6 in Fig. 1. Such an element when connected to a proper piping system, comprising a suitable water-heater, such as a furnace or a heat-absorbing fire-place element such as shown at 5, Fig. 1, or in Figs. 2, 3 and 4 and 9, 10, and 11, will obviously form a substitute for a radiator of any of the present accepted constructions, and will, due to its location within the fire-place, and its use as the hearth therefor, be out of the way, and free space capable of better use for other purposes.

In Figs. 12 and 13, I have shown a form of the invention comprising a hollow base for the floor of a fire space, and an extended hearth 46, and which has a depression 47 therein to permit the circulation of air to below the logs resting on the hearth and across the depression. An ash door 20, such as before described, may be located in the depression. In this case, the heating of the fluid circulating medium is due to conduction through the metal side of the base which is toward the fire.

Pipes 7ª and 7 are shown entering the base, while pipe 17 rises from the rear of the top of the base.

In Figs. 14 and 15, the base is shown without the central depression of Figs. 12 and 13, and as comprising a hollow slab casting 51 (which may be sectionalized if desired) and connected with suitable circulating pipes 7 and 7ª. On such a hearth, suitable fire-supporting and holding devices of any desired kind may be erected. In the figures such devices are shown in the form of andirons 52 made from pipes with suitable ornamentations attached thereto. The andirons are shown as connected with the pipe 17 and forming the connection thereof with the base.

In any construction care should be exercised that all parts receiving heat from the fire are so arranged that no traps will be formed to become filled with air to the exclusion of water, as under such circumstances the metal of the parts will be deprived of the protection afforded them against excessive heating and the warping and burning out attendant thereon, due to the lack of circulation inside of them. This circulation is provided for by the constructions shown and described herein. Furthermore, any traps in radiating parts should be provided with automatic valves (as instances of which see 45, Fig. 3), to permit the escape of air which may enter the system and gather in such parts.

It will be understood that while I have described my invention as used in connection with a hot-water-heating system, it is applicable in part also for use with a steam system with such changes in the piping as may be rendered necessary thereby. In this case it will probably not be desirable to make use of the fire-place element as a heat-absorber, but to use it solely as a radiating element.

It will be further seen that by the use of the hollow base 8 with a circulating medium therein, protection is afforded to the floor structure, including the joists and headers thereof against excessive heating and consequent danger of fire.

A system such as herein described may be used either in its entirety or in its constituent parts as the sole means of heating, or as an auxiliary to other means. Under certain circumstances, a fire-place heat-absorbing element, with a heat-radiating hearth may not only be sufficient to warm the room in which it is located, but may also be capable of imparting heat to other radiating elements without the use of a furnace.

Having thus described my invention, what I claim and desire to secure by Letters Patent is,—

1. In a circulating water heating system, a heating element for the water comprising a hollow fire supporting hearth forming the floor of an open fire-place.

2. The combination with a fire-place element having a hollow base and hollow rear portions arising therefrom and forming a combustion space, a portion of the hollow base projecting beyond and in front of the fire-place and forming a hearth therefor and containing a heated fluid circulating medium, and radiating elements arising from the hearth on each side of the fire-place.

3. A heating element comprising a hollow base, rear and side walls, rear andirons projecting from the rear wall, front andirons discontinuous from the rear andirons, and front walls connecting the forward ends of the front andirons with the side walls, all of the said walls and andirons being hollow and arising from the base, the interior cavities in each of the said parts communicating with the cavities of the other parts with which such parts abut, and with the cavity of the base at the points from which they arise.

4. A heating element comprising a hollow base, rear and side walls, rear andirons projecting from the rear wall, front andirons discontinuous from the rear andirons, and being out of alinement therewith, and front walls connecting the forward ends of the front andirons with the side walls, all of the said walls and andirons being hollow and arising from the base, the interior cavities in each of the said parts communicating with the cavities of the other parts with which parts abut, and with the cavity of the base at the points at which they arise.

5. A heating element comprising a hollow base, rear and side walls, rear andirons projecting from the rear wall, front andirons discontinuous from the rear andirons, and being out of alinement therewith, and front walls connecting the forward ends of the front andirons with the side walls, all of the said walls and andirons being hollow and arising from the base, the interior cavities in each of the said parts communicating with the cavity of the other parts with which such parts abut, and with the cavity of base at the points at which they arise.

6. A heating element comprising a hollow base, hollow rear and side walls arising therefrom, hollow andirons arising from the base and projecting from the rear wall, the cavities in the andirons being connected with cavities in the base and rear walls throughout their contact with each other.

DAVID T. KENNEY.